United States Patent [19]

Fisch

[11] 4,025,322

[45] May 24, 1977

[54] REMOVAL OF HYDROCARBONS AND WATER FROM ACID GAS STREAMS

[75] Inventor: Edwin J. Fisch, Houston, Tex.

[73] Assignee: Shell Oil Company, Houston, Tex.

[22] Filed: Apr. 30, 1976

[21] Appl. No.: 681,872

Related U.S. Application Data

[63] Continuation of Ser. No. 578,844, May 19, 1975, abandoned.

[52] U.S. Cl. .................................. 55/48; 55/56; 55/73; 423/228
[51] Int. Cl.² ........................................ B01D 53/14
[58] Field of Search ............... 55/37, 56, 73, 48; 423/220, 228, 229, 567

[56] References Cited

UNITED STATES PATENTS

| | | | |
|---|---|---|---|
| 2,381,092 | 8/1945 | Wilson | 55/56 X |
| 3,347,621 | 10/1967 | Papadopoulos et al. | 55/73 X |
| 3,709,976 | 1/1973 | Tarhan | 55/73 X |
| 3,710,546 | 1/1973 | Gruenwald et al. | 55/73 X |

*Primary Examiner*—John Adee
*Attorney, Agent, or Firm*—Albert J. Adamcik

[57] ABSTRACT

Sour gas streams containing significant quantities of contaminating $H_2S$ and aromatic hydrocarbons are contacted with an aqueous absorbent to remove the contaminants and produce a sweet gas, the contaminants are desorbed and contacted with a selective absorbent which absorbs the aromatic hydrocarbons and rejects the $H_2S$, and the aromatic hydrocarbons are recovered. If $CO_2$ is also present in the sour gas, provision is also made for its removal from the gas stream.

6 Claims, 1 Drawing Figure

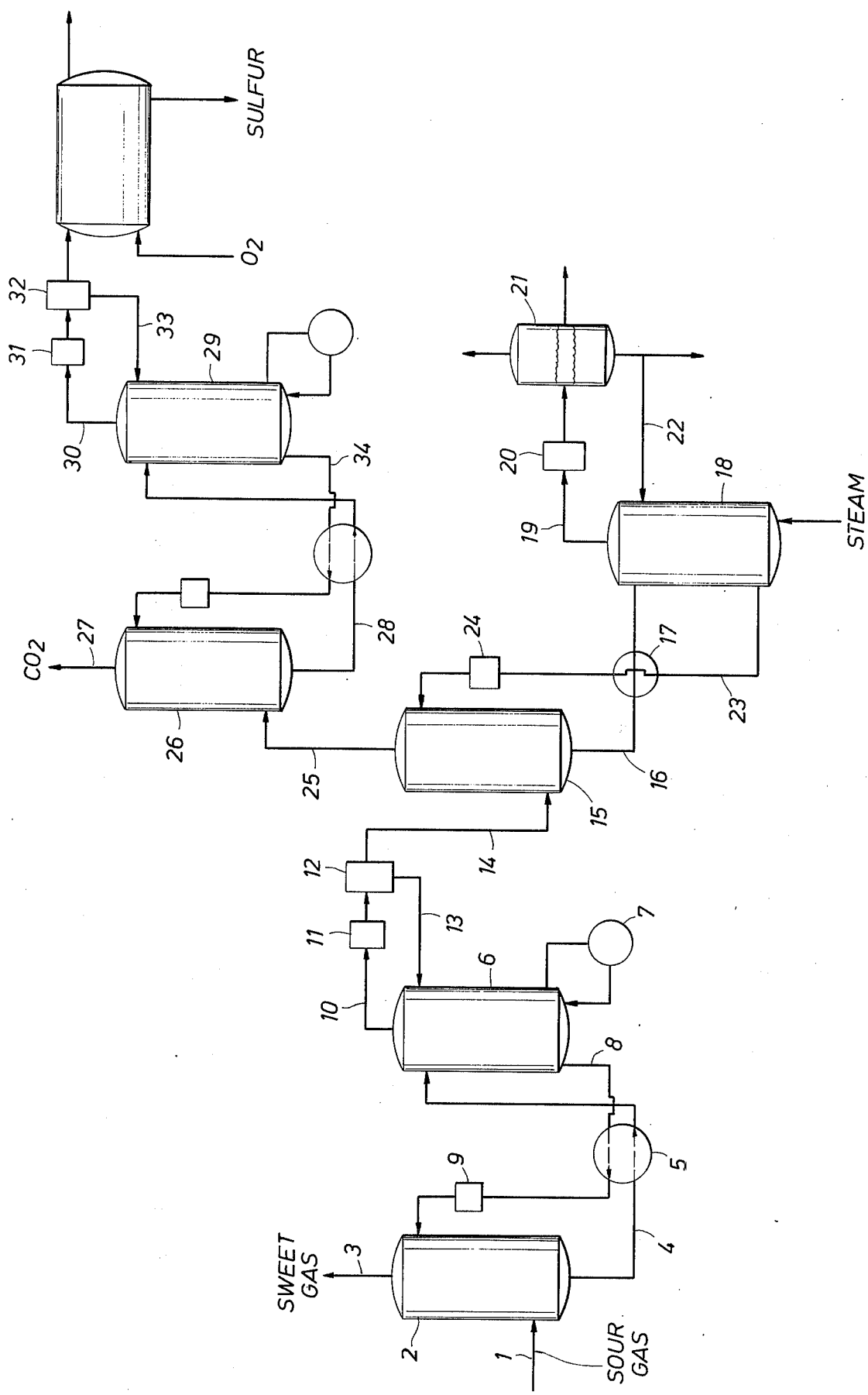

REMOVAL OF HYDROCARBONS AND WATER FROM ACID GAS STREAMS

This is a continuation of application Ser. No. 578,844 filed May 19, 1975, now abandoned.

BACKGROUND OF THE INVENTION

The hydrogen sulfide content of some naturally occurring cases, synthesis gases process gases, and fuel gases produced by gasification procedures, e.g., gases produced by the gasification of coal, petroleum, shale, tar sands, etc., is often at environmentally unacceptable levels. In order to meet increasingly stringent total sulfur content requirements, effective procedures for removal of this contaminant from these "sour" gases are necessary.

One problem associated with the absorption removal of $H_2S$ from such streams is that the gases mentioned also commonly contain significant amounts of aromatic hydrocarbons which also tend to be absorbed. Obviously, the removal of these materials with $H_2S$ poses problems which must be solved in further treatment steps. For example, the presence of aromatic hydrocarbons causes discoloration of the sulfur which may be produced in any sulfur recovery step. Again, if the aromatic hydrocarbons are not recovered, a valuable material is wasted. Accordingly, there exists a genuine need for an economical method for removal of $H_2S$ and aromatic hydrocarbons from desired gaseous streams which avoids these problems and disadvantages.

SUMMARY OF THE INVENTION

The present invention overcomes the difficulties mentioned by providing a method for removal of the $H_2S$ and aromatic hydrocarbon content from desired gases which non-selectively removes the $H_2S$ and aromatic hydrocarbons from the gas, and concentrates the $H_2S$ by separation of the aromatic hydrocarbons therefrom. The $H_2S$ gas stream produced is suitable for treatment to recover the $H_2S$ as elemental sulfur. Off-gases from the sulfur recovery unit (e.g. a Claus unit) may be processed further to provide effluent which is well within limits established by pollution control requirements. If $CO_2$ is also present in the sour gas, provision is made for its separation from the sour gas also.

More particularly, the invention comprises a process of the removal of $H_2S$ and aromatic hydrocarbons from sour gases, comprising, (A) contacting the sour gas in an absorption zone and absorbing the $H_2S$ and aromatic hydrocarbons with a selective aqueous absorbent mixture, and producing a sweet product gas and a loaded absorbent; (B) passing the loaded absorbent to a first desorption zone and regenerating the loaded absorbent, and producing a gas stream containing principally $H_2S$ and aromatic hydrocarbons; (C) selectively absorbing the aromatic hydrocarbons from the gas stream, and producing an aromatic hydrocarbon-rich absorbent and an $H_2S$ containing acid gas stream; (D) passing the aromatic hydrocarbon-rich absorbent to a second desorption zone and regenerating the aromatic hydrocarbons from the aromatic hydrocarbon-rich absorbent. The aromatic hydrocarbons may be recovered, and the $H_2S$ in the $H_2S$ containing acid gas stream may also be recovered, preferably as elemental sulfur. As indicated, off-gases from the sulfur recovery step are processed by procedures known to those skilled in the art.

Although the present invention is directed primarily to removal of $H_2S$ and aromatic hydrocarbons from streams which contain low amounts, if any, of $CO_2$, the invention also contemplates the "sweetening" of streams containing this additional component or contaminant. Where large amounts of $CO_2$ are present, the $H_2S$ cannot be recovered economically without concentration of the $H_2S$, and the invention takes this fact into account. Accordingly, the invention also provides a process for the removal of $H_2S$, $CO_2$ and aromatic hydrocarbons from sour gases, comprising, (A) contacting the sour gas in an absorption zone and absorbing the acid gases and aromatic hydrocarbons with a selective aqueous absorbent mixture and producing a sweet product gas stream and a loaded absorbent; (B) passing the loaded absorbent to a first desorption zone and regenerating the loaded absorbent and producing a gas steam containing principally $H_2S$, $CO_2$ and aromatic hydrocarbons; (C) selectively absorbing the aromatic hydrocarbons from the gas stream, and producing an aromatic hydrocarbon-rich absorbent and an $H_2S$ containing acid gas stream; (D) passing the aromatic hydrocarbon-rich absorbent to a second desorption zone and regenerating the aromatic hydrocarbons from the aromatic hydrocarbon-rich absorbent; (E) selectively absorbing $H_2S$ from the $H_2S$ containing acid gas stream to produce a $CO_2$-containing stream and an $H_2S$-rich absorbent; (F) regenerating the $H_2S$-rich absorbent to produce an $H_2S$ gas stream. The aromatic hydrocarbons and $H_2S$ may be recovered, as indicated.

According to the first step of the process, the sour gas stream is contacted in a first or primary absorption zone in a manner that will absorb $H_2S$ and aromatic hydrocarbons (and $CO_2$, if present) from the gas in as effective manner as possible. Any of the known absorbents conventionally used may be employed. For example, aqueous alkali metal carbonate and phosphate, and certain aqueous alkanolamines, such as alkyl diethanolamines, may be used. If an alkanolamine is employed, a physical solvent component may also be used to enhance the absorption of COS, an additional contaminant commonly found in the gaseous streams contemplated. Suitable alkanolamines include methyldiethanolamine, triethanolamine, or one or more dipropanolamines, such as di-n-propanolamine or diisopropanolamine. Aqueous methyldiethanolamine, triethanolamine and dipropanolamine solutions are preferred absorbents, particularly aqueous diisopropanolamine and methyldiethanolamine solutions. An especially preferred absorbent for treating gases at higher pressures, e.g., natural gas pressures of 100 to 1200 p.s.i.g., is an aqueous diisopropanolamine solution which additionally contains a minor amount of a physical solvent such as a substituted or unsubstituted tetramethylene sulfone. Either high purity disopropanolamine may be used or technical mixtures of dipropanolamine such as are obtained as the by-product of diethanolamine production may be used. Such technical mixtures normally consit of more than 90% by weight of diisopropanolamine and 10% by weight or less of mono- and tri-propanolamines and possibly trace amounts of diethanolamine. Concentrations of aqueous alkanolamine solutions may vary widely, and those skilled in the art can adjust solution concentrations to achieve suitable absorption levels. In general, the concentration of alkanolamine in aqueous solutions will be from 5 to 60% by weight, and preferably between 25 and 50% by weight. If a physical solvent is employed as a component of the absorbent liquid, it can be present in an amount of from 2 to 50% by weight, preferably from 5 to 45% by weight.

As indicated, the preferred absorbent liquid for treating COS-containing streams contains a significant amount of a tetramethylene sulfone (the unsubstituted compound is known as sulfolane). Suitable sulfolanes (substituted and unsubstituted) contain from zero to two substituent radicals which are selected from alkyl of from 1 through 4 carbon atoms, with a total of 4 alkyl carbon atoms, the alkyl radicals being attached to different ring carbon atoms. Preferred sutstituted sulfolanes are those having methyl substituents. Representative substituted sulfolanes are 2-methyl sulfolane, 3-methyl sulfolane, 2,3-dimethyl sulfolane, 2,4-dimethyl sulfolane, 3,4-dimethyl sulfolane, 3-ethyl sulfolane and 2-methyl 5-propyl sulfolane. Sulfolane is a particularly preferred physical solvent for use in conjunction with diisopropanolamine absorbent. During the absorption step, and under the conditions disclosed herein, the bulk of the COS absorbed is hydrolyzed to $CO_2$ and $H_2S$, which are immediately absorbed.

Suitable temperature and pressure relationships for different selective absorbents are known, or can be calculated by those skilled in the art. The temperatures employed in the primary absorption zone are not critical, and a relatively wide range of temperatures, e.g., from 0° C to 100° C may be utilized depending upon the particular solvent employed, A range of from about 0° C to about 85° C is preferred. In many commercial applications, such as the removal of the listed contaminants from natural gas to meet pipeline specifications, absorption at ambient temperatures is preferred since the cost of refrigeration would exceed the benefits obtained due to increased absorption at the lower temperature. However, certain applications such as the treatment of acid gas mixtures containing relatively high concentrations of $CO_2$ vis-a-vis $H_2S$, absorption is conducted at relatively low temperatures, i.e., below 30° C and preferably below 10° C, even though refrigeration of the solvent and/or feed may be required. Average contact times are highly flexible, and may range from about 0.2 minute to about 8 minutes, with contact times of 0.5 minute to 5 minutes being preferred.

Similarly, in the primary regeneration or desorption zone, temperatures may be varied widely, the only requirement being that the temperature be sufficient to reduce the $H_2S$ content in the absorbent to a level which corresponds to an equilibrium loading for an $H_2S$ content having less than 50 percent (preferably 10 percent) of the $H_2S$ content of the treated gas. The term "equilibrium loading" may be defined as that concentration of $H_2S$ in the liquid absorbent which is in equilibrium with the concentration of $H_2S$ in the treated gas leaving the absorber, at the temperature and pressure at top of the absorber. Equilibrium loading conditions for $H_2S$ and $CO_2$ at varying concentrations, temperatures and pressures for different hydrogen-sulfide selective absorbents are known or can be calculated by known methods and hence need not be detailed herein. In general, temperatures of from about 90° C to 180° C, preferably from 100 ° C to 170° C, may be employed.

In the second step of the process, the overhead gas from the desorption zone, containing a substantial quantity of aromatic hydrocarbons, is contacted with an absorbent which is selective with respect to the aromatic hydrocarbons to be absorbed. Generally, the aromatics to be absorbed include, but are not limited to benzene, toluene, and xylenes, with minor amounts of such materials as ethyl benzene, napthalenes, various higher alkyl benzenes, as well as various aromatic materials not technically described as "hydrocarbon", such as phenol, cresol, and thiopene, ect,. whole absorption is also within the scope of the invention. The amount of aromatic hydrocarbons which will be removed from the acid gas will depend, of course, on the amount present in and absorbed from the sour feed gas. Since this value varies widely, depending on, for example, the source of the feedstock, etc., no precise limits can be given. However, the invention is well suited to removal of aromatic hydrocarbons from streams having from about 0.1 mol percent to about 3.0 mol percent aromatic hydrocarbons, and preferably form 0.1 mol percent to 2.0 mol percent. Any absorbent which will remove the aromatic hydrocarbons selectively from the acid gas may be used. For example, sulfolane, the substituted sulfolanes mentioned, n-methy pyrrolidone, mixtures thereof, and compositions containing these materials or mixtures thereof and up to 10 percent water may be used. Sulfolane, or sulfolane containing up to 5 percent water, is preferred.

The particular temperatures, pressures, etc. employed in this secondary absorption zone are a matter of choice, provided the desired selection of the aromatic hydrocarbons and rejection of $H_2S$ (and $CO_2$, if present) are achieved, In general, the conditions emloyed in the primary absorption zone may be employed. The aromatic hydrocarbon-rich absorbent may be regenerated by conventional methods, e.g., by stripping with steam or by addition of heat in a stripping zone or column. Temperatures, pressures, etc., are dependent, e.g., on the nature and loading of the absorbent, the desired degree of stripping, etc. In general, temperatures in the regeneration zone may range from about 60° to about 220° C, with temperatures of from about 60° C to about 200° C being preferred. Pressures will range from about 1 p.s.i.g. to about 15 p.s.i.g., with pressures of from about 5 p.s.i.g. to about 10 p.s.i.g. being preferred. The aromatic hydrocarbons are recovered from the regeneration zone and worked up as desired. For example, they may be subjected to a variety of separation and purification techniques. Specifically, they may be fractionally distilled or subjected to solvent extraction and worked up to the degree of purity desired. The particular purification and separation procedures employed form no part of the present invention, and are well within the skill of the art.

If significant quantities of $CO_2$ are present in the overhead from the secondary absorption zone, the $H_2S$ in the stream must be concentrated if Claus plant treatment is to be used. Accordingly, the overhead gas (principally $H_2S$ and $CO_2$) — and now freed of the aromatic hydrocarbons — is passed to a selective absorption zone wherein $H_2S$ is selectively absorbed and a substantial portion of the $CO_2$ is rejected. The particular absorbents, temperatures, pressures etc. employed in this absorption zone are a matter of choice, provided the desired selection of $H_2S$ and rejection of $CO_2$ are achieved. In general, the absorbents employed in the primary absorption zone may be employed. However, although general composition, temperature, and pressure conditions are similar, adjustment must be made to give the desired rejection of $CO_2$. For example, use may be made of that process described in Canadian Pat. No. 947,045, issued May 14, 1974. Following the patented process, the $H_2S$ is selectively removed from the hydrogen sulfide and carbon dioxide containing gaseous mixture by contacting the gaseous mixture with an aqueous solution of a hydrogen sulfide-selective absorbent in an absorption column having fewer than 20 contacting trays. The trays have an average dry tray pressure drop of from about 1.0 to about 5 inches of liquid, and a gas velocity of at least one meter per second, preferably 2 to 4 meters per second, is maintained. The bulk of the $CO_2$ is rejected, and a hydrogen sulfide-enriched absorbent solution is obtained. The hydrogen sulfide-enriched absorbent solution is then passed to a regenerating zone and the absorbent is stripped to a hydrogen sulfide content having less than 50 percent (preferably less than 10 percent) of the hydrogen sulfide concentration in equilibrium with the $H_2S$ concentration of the treated gas. The regenerated absorbent solution is then returned for contact with the hydrogen sulfide and carbon dioxide-containing gaseous mixture, and the liberated $H_2S$, etc., is passed for further processing. As indicated, any alkaline absorbent solution which has an appreciably greater affinity for $h_2S$ than for $CO_2$, (i.e., is "hydrogen sulfide-selective") can be employed in this phase of the invention.

Liberated $H_2S$ may be treated by any conventional process for the recovery of the gas. However, the $H_2S$ is preferably treated by that process known as the "Claus" process. In the "Claus" process, elemental sulfur is prepared by partial oxidation or the $H_2S$ to sulfur dioxide, using an oxygen-containing gas (including pure oxygen) followed by the reaction of the sulfur dioxide with the remaining part of the hydrogen sulfide, in the presence of a catalyst. This process, which is used frequently at refineries, and also for the workup of hydrogen sulfide recovered from natural gas, is carried out in a plant which typically comprises a combustion chamber followed by one or more catalyst beds between which are arranged one or more condensers in which the reaction products are cooled and the separated liquid elemental sulfur is recovered. Since the yield of recovered elemental sulfur, relative to the hydrogen sulfide introduced, is not quantitative, a certain amount of unreacted hydrogen sulfide and sulfur dioxide remains in the Claus off-gases. These gases are normally incinerated in a furnace or treated in other ways known to those skilled in the art. To some extent, the amount of elemental sulfur recovered depends on the number of catalyst beds employed in the Claus process. In principle, 98% of the total sulfur available can be recovered when three beds are used.

DETAILED DESCRIPTION OF THE INVENTION

In order to describe the invention in greater detail, reference is made to the accompanying drawing. The values given herein relating to temperatures, pressures, compositions, etc., should be considered merely exemplary and not as delimiting the invention.

Sour natural gas, containing $H_2S$, COS, and a significant amount of aromatic hydrocarbons, in line 1 enters absorption column 2 (tray type) which contains an absorbent composed of 40 percent diisopropanolamine, 15 percent $H_2O$, and 45 percent sulfolane (all percentages by weight). The pressure of the feed gas is about 100 p.s.i.g., and the temperature of the lean absorbent is about 45° C. A contact time of about 1.0 minute is employed in order to absorb virtually all $H_2S$ and aromatic hydrocarbons. Under these conditions, any COS present will be rapidly absorbed and the bulk of it hydrolyzed to $CO_2$ and $H_2S$. The $CO_2$ and $H_2S$ formed are absorbed immediately, and purified or "sweet" gas leaves absorption column 2 through lines 3. The "sweet" gas is of a purity sufficient to meet standard requirements. Loaded or rich absorbent, i.e. absorbent containing the absorbed $H_2S$ and aromatic hydrocarbons is passed through line 4 through heat exchanger 5 where heat is imparted to the stream. The absorbent is then regenerated in regenerating or stripping column 6 to free the $H_2S$ and aromatic hydrocarbons from the absorbent. Other types of stripping units may be used. Additional heat is provided by reboiler 7. The temperature in the bottom of stripping column 6 is about 132° C, while the temperature at the top of the column will be about 90° C. Pressure is maintained in the stripping column at about 10 p.s.i.g. As will by apparent to those skilled in the art, temperatures and pressures may be adjusted to provide the appropriate residual concentration of contaminants in the lean absorbent returned to column 2 to provide the degree of treating desired.

The stripped or "lean" absorbent is returned, preferably, through line 8, through heat exchanger 5 and cooler 9 to absorption column 2. From regeneration column 6, the liberated $H_2S$ and aromatic hydrocarbons are passed through line 10 through cooler 11. Accumulator 12 provides for collection of carryover absorbent (including condensed water), and is normally operated at 20° to 50° C below the temperature in the top of stripping column 6. Condensed water and any carryover absorbent is returned via line 13 regeneration column 6.

At this point, the invention provides for the effective removal of the aromatic hydrocarbon content of the acid gas stream. Accordingly, the gas stream from condenser 12 is passed through line 14 to absorption zone 15 where the stream is contacted with an aromatic hydrocarbon selective absorbent, e.g., a solution of 95 percent sulfolane and 5 percent water. Temperature of the lean absorbent is about 38° C, and pressure is maintained at about 10 p.s.i.g. The aromatic hydrocarbon-rich absorbent is passed through line 16 through heat exchanger 17 to regeneration column 18 where the aromatic hydrocarbons are stripped from the absorbent. Column 18 may be conventional design, e.g., a plate column or packed tower. The hydrocarbons are preferably stripped with steam, e.g., at about 150° C and 21 p.s.i.g., although other temperatures, etc., may be employed. Overhead from column 18 is sent through line 19 to indirect heat exchanger 20 where it is cooled and at least partially condensed; condensate is collected in a conventional accumulator vessel 21. Accumulator 21 is preferably designed to permit withdrawal of the hydrocarbon and aqueous phases separately. The aromatic hydrocarbon phase may be sent to purification and workup steps (not shown), while at least part of the aqueous phase is returned via line 22 to column 18 for reflux. Excess aqueous phase is removed for reuse (after stripping to remove dissolved $H_2S$, $CO_2$ and aromatic hydrocarbons). Any non-condensables in the accumulator may be vented or directed to further processing (not shown). Lean absorbent is returned via line 23 through heat exchanger 17 and cooler 24 to contactor 15.

If the $CO_2$ content of the sour gas treated is low, the gas stream leaving contactor 15 is composed almost exclusively of $H_2S$ saturated with water vapor. This stream may be used directly in recovery procedures, e.g. in a Claus plant. If, however, the original gas stream contains significant quantities of $CO_2$, the gas stream is treated as hereinafter described. Those skilled in the art will recognize that the presence of $CO_2$ in the stream does not significantly alter the procedure hereinbefore described, the pressure, temperature, etc. conditions being identical or analogous.

If the stream leaving contactor 15 contains significant quantities of $CO_2$, the stream is passed through line 25 to absorption column 26. Absorption column 26 is a twelve tray column and is operated in a manner which will reject the $CO_2$, but absorb $H_2S$. For example, a liquid absorbent containing about 27 percent by weight diisopropanolamine and about 73 percent by weight water is used. The temperature of the lean absorbent is about 40° C and a pressure of about 7 p.s.i.g. The trays have an average dry tray pressure drop of two to three inches of liquid, and velocity of the stream is about two meters per second. $CO_2$ is vented continuously through line 27, while the $H_2S$-rich absorbent is passed continuously through line 28 to regeneration or desorption column 29.

Desorption column 29 is operated much in the fashion of column 6, except that the $CO_2$ and $H_2S$ content of the absorbent are regulated to return the desired lean mixture back to column 26. The liberated gas stream, now containing 30 percent to 50 percent by volume $H_2S$, the balance being $CO_2$, is passed through line 30 through heat exchanger 31 and accumulator 32. In accumulator 32 carryover absorbent is collected and returned via line 33 to column 29. Lean solvent is returned to column 26 via line 34. $H_2S$ from accumulator condenser 32 is passed to a recovery step such as a Clau unit for conversion to elemental sulfur. Off-gases from the Claus units may be processed according to techniques known to those skilled in the art.

While the invention has been illustrated with respect to particular apparatus, those skilled in the art will recognize that other equivalent or analogous units may be employed. Again, all pumps, valves, etc. have not been illustrated, as such expedients can readily be supplied by those familiar with the art.

I claim:

1. A process for the removal of $H_2S$, $CO_2$ and aromatic hydrocarbons from sour gases, comprising, (A) contacting the sour gas in an absorption zone and absorbing the $H_2S$, $CO_2$, and aromatic hydrocarbons with a selective aqueous absorbent mixture and producing a sweet product gas stream and a loaded absorbent; (B) passing the loaded absorbent to a first desorption zone and regenerating the loaded absorbent and producing a gas stream containing principally $H_2S$, $CO_2$ and aromatic hydrocarbons; (C) selectively absorbing the aromatic hydrocarbons from the gas stream, and producing an aromatic hydrocarbon-rich absorbent and an $H_2S$, $CO_2$-containing gas stream; (D) passing the aromatic hydrocarbon-rich absorbent to a second desorption zone and regenerating the aromatic hydrocarbons from the aromatic hydrocarbon-rich stream, and recovering the aromatic hydrocarbons; (E) selectively absorbing $H_2S$ from the $H_2S$, $CO_2$-containing gas stream to produce a $CO_2$-containing stream and an $H_2S$-rich absorbent; (F) and regenerating the $H_2S$-rich absorbent to produce an $H_2S$-containing gas stream containing a high proportion of $H_2S$.

2. The method of claim 1 wherein the absorbent comprises sulfolane containing up to 10 percent water by weight.

3. The method of claim 2 wherein the sulfolane contains up to 5 percent water by weight.

4. A process for the removal of $H_2S$ and aromatic hydrocarbons from sour gases, comprising, (A) contacting the sour gas in an absorption zone and absorbing the $H_2S$ and aromatic hydrocarbons with a selective aqueous absorbent mixture, and producing a sweet product gas and a loaded absorbent; (B) passing the loaded absorbent to a first desorption zone and regenerating the loaded absorbent, and producing a gas stream containing principally $H_2S$ and aromatic hydrocarbons; (C) selectively absorbing the aromatic hydrocarbons from the gas stream in an absorbent containing a component selected from sulfolane, substituted sulfolanes, n-methyl pyrolidone, mixtures thereof, and compositions containing said materials or mixtures thereof and up to 10 percent water, and producing an aromatic hydrocarbon-rich absorbent and an $H_2S$-containing gas stream; (D) passing the aromatic hydrocarbon-rich absorbent to a second desorption zone and regenerating the aromatic hydrocarbons from the aromatic hydrocarbon-rich absorbent.

5. The method of claim 4 wherein the absorbent comprises sulfolane containing up to 10 percent water by weight.

6. The method of claim 5 wherein the sulfolane contains up to 5 percent water by weight.

* * * * *